(12) United States Patent
Mintgen et al.

(10) Patent No.: US 7,331,435 B2
(45) Date of Patent: Feb. 19, 2008

(54) CONTINUOUSLY BLOCKABLE ARRESTING DEVICE

(75) Inventors: Rolf Mintgen, Thür (DE); Wilhelm Schwab, Neuwied (DE); Paul Muders, Rhens (DE)

(73) Assignee: Stabilus GmbH, Koblenz (DE)

( * ) Notice: Subject to any disclaimer, the term of this patent is extended or adjusted under 35 U.S.C. 154(b) by 881 days.

(21) Appl. No.: 10/685,894

(22) Filed: Oct. 15, 2003

(65) Prior Publication Data

US 2004/0151599 A1  Aug. 5, 2004

(30) Foreign Application Priority Data

Oct. 15, 2002  (DE) .............................. 102 47 945

(51) Int. Cl.
*F16F 9/28* (2006.01)
(52) U.S. Cl. .......................... 188/303; 267/223; 16/54; 16/56; 16/71
(58) Field of Classification Search ................ 16/51, 16/53, 54, 56, DIG. 17, 71, 58, DIG. 9, DIG. 21; 267/223; 188/303

See application file for complete search history.

(56) References Cited

U.S. PATENT DOCUMENTS

| | | | |
|---|---|---|---|
| 1,521,682 A | | 1/1925 | Gunn |
| 1,834,439 A | * | 12/1931 | Veitch ......................... 188/303 |
| 1,931,735 A | | 10/1933 | Lottritz |
| 5,086,689 A | * | 2/1992 | Masuda ....................... 91/499 |
| 5,829,097 A | * | 11/1998 | Toledo ........................ 16/53 |

FOREIGN PATENT DOCUMENTS

| | | |
|---|---|---|
| DE | 202222 | 2/1908 |
| DE | 314798 | 10/1919 |
| DE | 883569 | 7/1953 |
| DE | 19526061 A1 | 1/1997 |
| DE | 9018185 U1 | 3/2000 |
| DE | 20007762 U1 | 10/2000 |
| DE | 100 03 880 A1 | 8/2001 |
| GB | 170786 | 1/1921 |
| JP | 52-15639 | 4/1977 |
| WO | WO 00/42282 | 7/2000 |

* cited by examiner

*Primary Examiner*—Devon Kramer
(74) *Attorney, Agent, or Firm*—Cohen Pontani Lieberman & Pavane LLP

(57) ABSTRACT

A continuously blockable arresting device includes a housing and a shaft having an end received in the housing and which may be externally acted upon causing rotation thereof. The housing has a fluid-filled working space and two subchambers which can be connected to the working space. The subchambers lie next to each other. First and second pistons are guided respectively in a displaceable manner in the subchambers and can be displaced therein by a swash plate. The shaft is connected to the swash plate for rotating the swash plate. Respective control devices of the subchambers include blocking valves for respectively connecting the subchambers to the working space and passage valves for respectively connecting the working space to the subchambers.

18 Claims, 3 Drawing Sheets

CONTINUOUSLY BLOCKABLE ARRESTING DEVICE

BACKGROUND OF THE INVENTION

1. Field of the Invention

The present invention relates to a continuously blockable arresting device having a housing and a shaft which is received in the housing, the shaft being acted upon externally to cause rotation of the shaft, and the arresting device having a fluid-filled working space situated in the housing and having a movable piston and a blocking valve. The arresting device is used on pivotably mounted parts such as for doors of motor vehicles.

2. Description of the Related Art

In a known continuously blockable arresting device, a piston rod is axially movably arranged in a cylinder, the working space of which is filled with a fluid. A blocking valve is arranged in the piston rod which permits the continuous blocking of the piston rod and therefore of the arresting device. The blocking valve is actuated by an actuating element which acts on the other end of the piston rod and is connected to the blocking valve by a transmission element arranged in the piston rod. An additional safety valve protects the arresting device against damage which may occur if there are large forces acting on the arresting device. One end of the arresting device is connected to the component to be pivoted via a receptacle which is situated at that end of the piston rod. The other end of the arresting device includes a receptacle arranged on an end of the cylinder which lies opposite the piston rod which is connectable to a second component. The component to be pivoted is also fastened to the second component. The arresting device is therefore arranged perpendicular in its axial extent which respect to the pivot axis of the component to be pivoted.

Because it is constructed as a cylinder and piston rod, this known arresting device has a considerable length in the axial extent. However, the structural space necessary for the arresting device is substantially larger, since the piston stroke executed by the piston rod has to be taken into consideration. As a result, when used in motor vehicle doors, the arresting device is essentially located in the interior of the motor vehicle door. The structural space required by the arresting device is not available for other devices. Furthermore, the complexity of this device with the hollow piston rod of and the components arranged therein is susceptible to faults. The multiplicity of components increases the production and installation outlay requirements for the arresting device.

SUMMARY OF THE INVENTION

The object of the present invention is to provide a continuously blockable arresting device which has a smaller structural space than that of the prior art. A further object is to provide an arresting device that is easier to produce, install and maintain than the prior art devices.

This object is achieved according to the present invention by an arresting device having a housing defining two subchambers which are connectable to a working space, wherein the two subchambers lie next to each other. Pistons are respectively guided in a displaceable manner in the subchambers. A swash plate drives the pistons in a displaceable manner. The swash plate is driveable in a rotatable manner by a shaft. Respective control devices of the subchambers include blocking valves for allowing a fluid flow connection from the subchambers to the working space and passage valves for allowing fluid flow connection from the working space to the subchambers.

The advantage of the arresting device according to the present invention is that it is of simple construction, has few components, and is reliable in its operation. The arrangement of the two subchambers which lie next to each other reduces the overall size in the axial extent compared to the prior art devices. The arresting device is thus very compact and permits versatile use. The small number of components allows cost-effective production and installation of the arresting device. Moreover, the construction of the arresting device allows it to be arranged outside the part to be pivoted, with the result that the construction space within the part to be pivoted is available for other devices and internal components.

To actuate the arresting device, the shaft is connected to an actuating element which is arranged perpendicularly on it. This enables the arresting device to be arranged in the pivot axis of the part to be pivoted or parallel to the pivot axis. Moreover, the compact manner of construction of the arresting device permits it to be arranged in the region of a hinge, with the result that the arresting device according to the present invention only uses the structural space which is already present in any case. In a particularly favorable embodiment, the hinge is the actuating element.

The control devices in the arresting device each comprise a blocking valve and a passage valve. The blocking valve associated with one subchamber may comprise a spring-loaded non-return valve which opens toward, i.e., allow flow toward, the other subchamber. This installation position enables the arresting device to respond particularly rapidly because the pressure for opening the blocking valve has merely to be built up in the fluid between the piston and the control device. The design of the blocking valves with a spring allows the fluid to flow from the subchamber into the other subchamber only from a certain pressure. In addition, in the blocked state high arresting forces are ensured. In this respect, the behavior of the arresting device, in particular the smooth-running capacity, may be set by an appropriate design of the blocking valves.

The passage valves of each subchamber allow the fluid displaced from the other subchamber to flow into the subchambers they are associated with. At the same time, they ensure that the fluid displaced from the subchamber they are associated with may only leave the subchamber through the blocking valve.

The fluid crosses between the subchambers through a passage in the working space connecting to two subchambers.

The fluid is acted upon particularly effectively if the fluid is clamped between the two pistons.

If the pistons are permanently in contact with the swash plate, the resetting of the pistons to a fully withdrawn position is ensured. Furthermore, both pistons act upon the fluid irrespective of the pivoting direction. More specifically, the piston which is inserted into one subchamber acts upon the fluid with a positive pressure, and the piston moving out of the other subchamber produces a negative pressure in the other subchamber. Each of the two pistons therefore assist the crossing over of the fluid, as a result of which a particularly smooth-running arresting device can be produced.

Permanent contact between the pistons and swash plate may be ensured by urging the pistons against the swash plate using springs, which may be either helical or disc springs.

The springs may be respectively arranged in the subchambers such that they are supported against the control devices.

The use of springs may be omitted if the pistons are connected to the swash plate by a form-fitting connection such as, for example, latching and plug-in connections. To permit an undisturbed relative movement between the piston end and the swash plate, the piston end may be of a spherical or conical design and mounted in a correspondingly designed receptacle on the swash plate.

To ensure the largest possible stroke between the two pistons, the two pistons are arranged on the swash plate at a large spacing from the center of the swash plate. The opposed movement of the pistons is achieved if the two pistons on the swash plate are at an angular spacing of 180°. Incompressible fluids have proven particularly favorable, since the fluids build up pressure virtually without delay.

Under certain boundary conditions, the pivoting angle of the part to be pivoted may be too small for the arresting device. In these cases, the stroke of the pistons is not sufficient to activate the control devices of the arresting device. In this case, a gear mechanism which converts the pivoting movement into a larger rotational movement of the swash plate may be used.

The gear mechanism may be arranged either between the swash plate and the shaft or between the shaft and the actuating element which actuates the shaft.

The gear mechanism is reliably protected against environmental influences if it is arranged within the housing. By contrast, existing arresting devices may be retrofitted with the gear mechanism in a simple manner if the latter is fastened to the outside of the housing. In this case, an additional housing may be used to protect the gear mechanism against external influences.

In the arresting device, the pressure ratios which, for their part, act on the spring-loaded non-return valves of the control devices, may change in the housing due to temperature influences. A volume of gas may be arranged in the working space on the side facing away from the pistons to compensate for temperature. This allows constant pressure ratios within the housing to be achieved in a particularly simple manner, as a result of which the arresting device always exhibits the same behavior. Reactions between the volume of gas and the fluid can be avoided in a simple manner if a membrane is arranged between them.

The volume of gas can be arranged in a structurally particularly simple manner if it is situated in the passage between the two subchambers.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
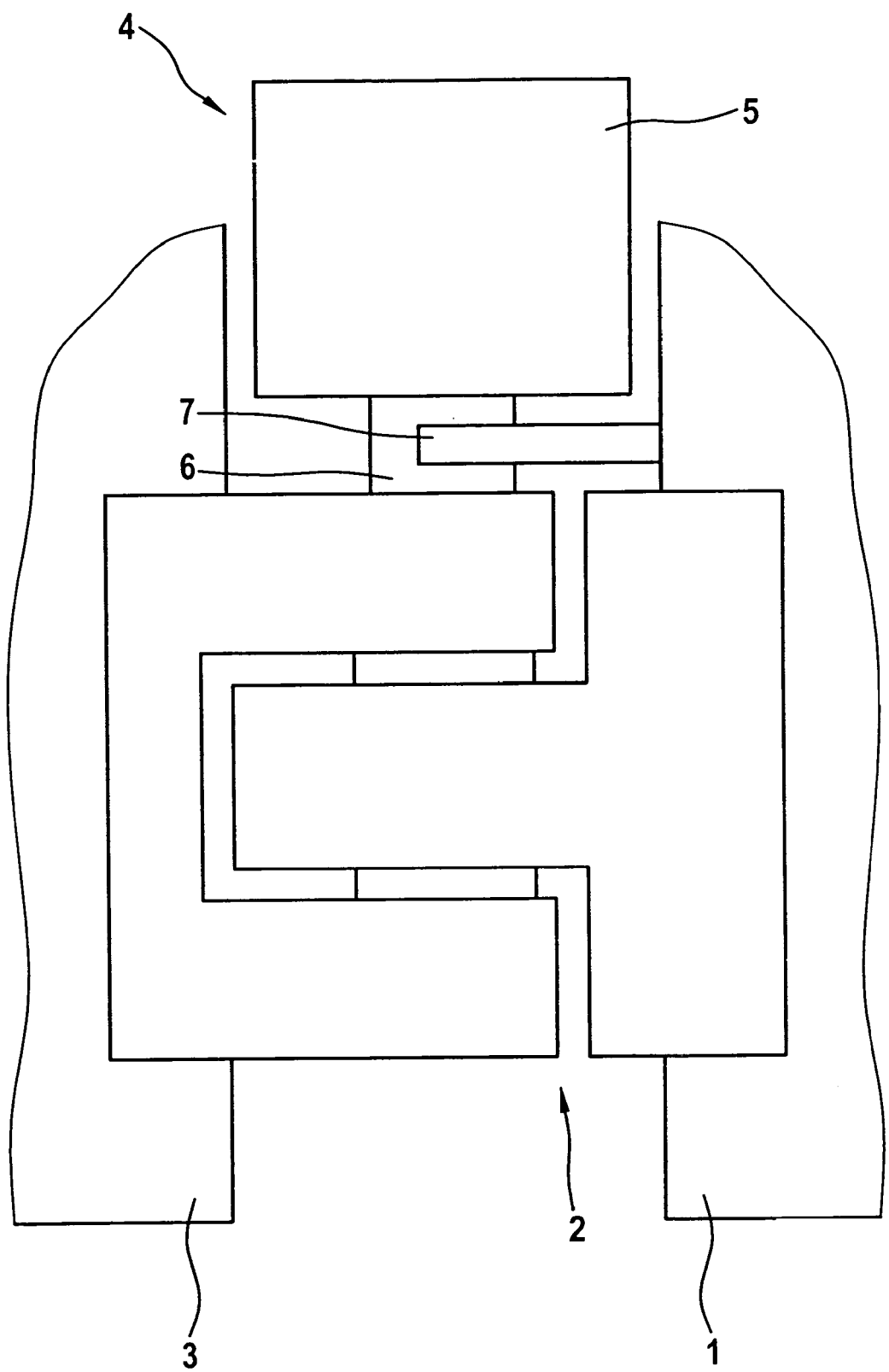
FIG. 1 is a schematic diagram of an arresting device according to the present invention in an installed position.

FIG. 1 shows a motor vehicle door 1 which is pivotably connected to a bodywork 3, i.e., vehicle frame, by a hinge 2. A continuously blockable arresting device 4 is arranged above the hinge 2 on the bodywork 3 in the pivot axis of the motor vehicle door 1. The arresting device 4 includes a housing 5 which receives one end of a shaft 6. The shaft 6 is connected to the motor vehicle door 1 by an actuating element 7 such that the shaft 6 rotates when the motor vehicle door 1 is pivoted.

Figure 2:
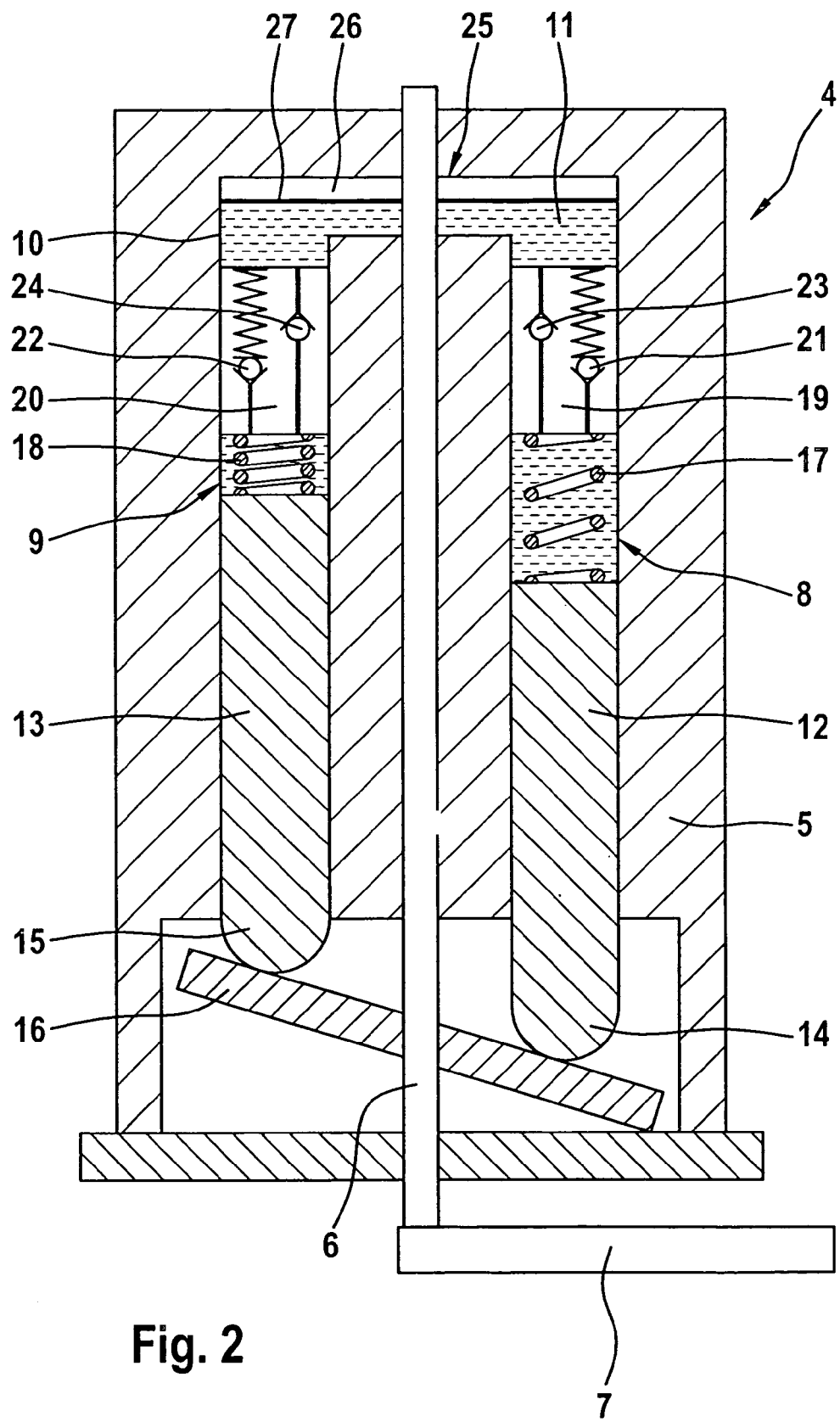
FIG. 2 is a longitudinal sectional view of the arresting device of FIG. 1.

FIG. 2 shows that the housing 5 of the arresting device 4 contains a working space 10 which is connectable to first and second subchambers 8, 9 and is filled with a fluid 11. First and second pistons 12, 13 are respectively arranged in a displaceable manner in the first and second subchambers 8, 9. The first and second pistons 12, 13 include respective ends 14, 15 which are arranged outside the first and second subchambers 8, 9. These ends 14, 15, are connected to a swash plate 16. The swash plate 16 is connected to the shaft 6 which is connected to the actuating element 7. When the shaft 6 is set into rotation during a pivoting movement of the motor vehicle door the swash plate 16 rotates with the shaft 6. The swash plate 16 is connected on the shaft 6 so that it wobbles when the shaft is rotates. To ensure permanent contact of each of the first and second pistons 12, 13 with the swash plate 16, the first and second pistons 12, 13 are prestressed against the swash plate 16 by respective springs 17, 18.

Figure 3:
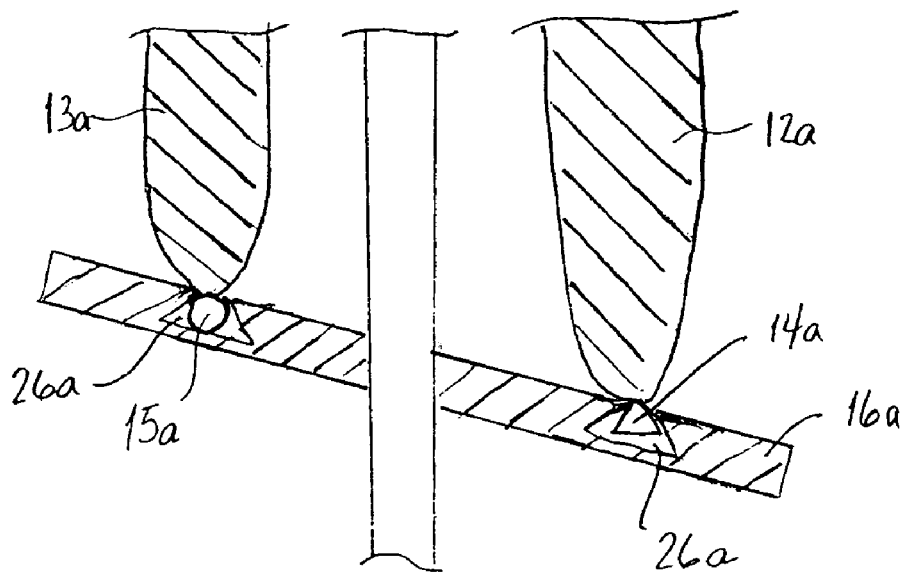
FIG. 3 is a partial view of an arresting device according to a further embodiment.

FIG. 3 is a partial view showing an alternative embodiment of the arresting device in which first and second pistons 12a, 13a are connected to a swash plate 16a by a form-fitting connection. In this embodiment, the end 14a of the first piston 12a has a conical design and the end 15a of the second piston 13a has a spherical design. Each of the ends is received in a receptacle 26a or channel such the pistons 12a, 13a follow the movement of the swash plate 16a. instead of having different shapes, each end 14a, 15a may by comprise the same spherical or conical shape.

A control device 19, 20 is arranged in each of the first and second subchambers 8, 9. Each of the control devices 19, 20 includes a respective blocking valve 21, 22 and a respective passage valve 23, 24. The passage valves 23, 24 are simple non-return valves which open to allow flow toward the piston 12, 13 located in the associated one of the first and second subchambers 8, 9. The blocking valves 21, 22 of each control device 19, 20 are spring-loaded and open to allow flow toward the other of the first and second subchambers 8, 9. The first and second subchambers 8, 9 are connected to each other by a crossing space 25 which allows the fluid 11 in the working space 10 to cross between the first and second subchambers 8, 9. Situated above the fluid 11 in the crossing space 25 is a volume of gas 26 which is separated from the fluid 11 by a membrane 27.

In the arrangement shown, the motor vehicle door 1 (see FIG. 1) is closed. In this position, the swash plate 16 is positioned such that the second piston 13 is situated in its upper reversal point in the second subchamber 9 and the first piston 12 is situated in its lower reversal point in the first subchamber 8. All of the valves 21-24 are closed. The two spring-loaded blocking valves 21, 22 prevent the fluid from crossing between the two subchambers 8, 9, so that the arresting device 4 is blocked. If the motor vehicle door 1 is pivoted, the shaft 6 rotates with the swash plate 16. Since the first and second pistons 12, 13 are each prestressed against the swash plate 16 by the springs 17, 18, the first piston 12 moves into the subchamber 8 while the second piston 13 exhibits the opposite behavior. The pressure produced by the movement of the first piston 12 into the first subchamber 8 opens the blocking valve 21 in the control device 19 while the passage valve 23 remains closed. As soon as the blocking valve 21 is opened, the blocking of the arresting device 4 is lifted. The fluid 11 now flows through the blocking valve 21 and the passage 25 into the second subchamber 9. The fluid 11 is only able to pass through the control device 20 through the passage valve 24. The blocking valve 22 remains closed. The crossing over of the fluid 11 is additionally assisted by the movement of the piston 13 out of the subchamber 9 under the urgency of the spring 18.

Figure 4:
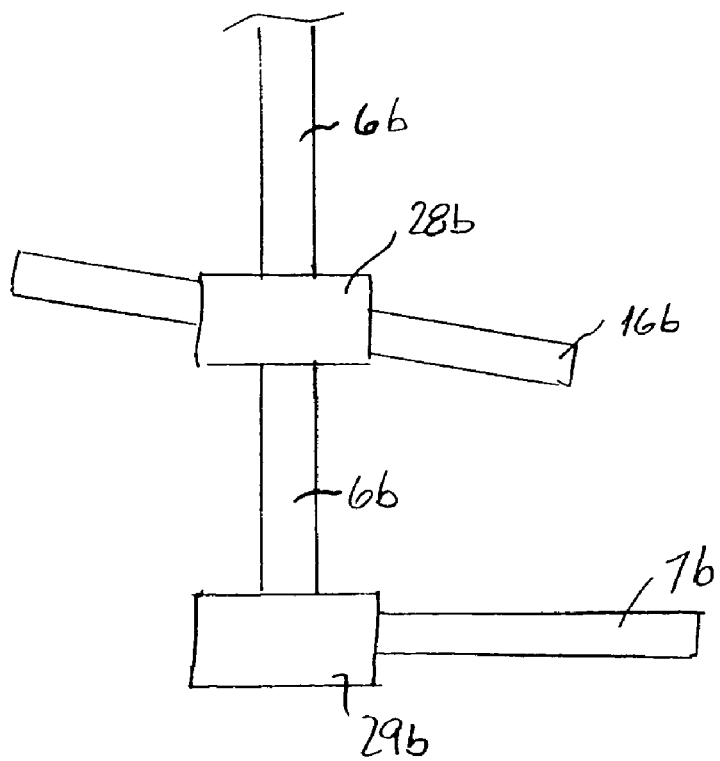
FIG. 4 is a partial view of an arresting device according to yet another embodiment.

FIG. 4 shows that a gear box 28*b* is arranged between a swash plate 16*b* and shaft 6*b* of an arresting device and a gear box 29*b* is arranged between an actuating element 2*b* and the shaft 6*b* of the arresting device. The gear boxes 28*b* and 29*b* are each arranged to convert pivoting movement of the actuating element 7*b* into a larger rotational movement of the swash plate 16*b*. Each gear box 28*b*, 29*b* may comprise a step-up gear mechanism. Depending on the particular requirements, one or the other of gear boxes 28*b*, 29*b* may be used.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A continuously blockable arresting device, comprising:
    a housing defining a working space and first and second subchambers;
    a shaft having an end received in said housing and being rotatable about a longitudinal axis in response to a force acting on said shaft from outside of the housing;
    a swash plate arranged on said shaft such that said swash plate rotates and wobbles when said shaft is rotated;
    first and second pistons respectively displaceably arranged in said first and second subchambers, said first and second pistons being operatively displaceable in said first and second subchambers in response to rotation of said swash plate; and
    a first control device arranged between said first subchamber and said working space and a second control device arranged between said second subchamber and said working space, each of said first and second control devices including a blocking valve for respectively connecting a flow from said first and second subchambers to said working space and a passage valve for respectively connecting a flow from the working space to said first and second subchambers.

2. The continuously blockable arresting device of claim 1, wherein said blocking valves comprise spring-loaded non-return valves.

3. The continuously blockable arresting device of claim 2, wherein said blocking valve of said first control device opens to allow flow toward said second subchamber and said blocking valve of said second control device opens to allow flow toward said first subchamber.

4. The continuously blockable arresting device of claim 2, wherein said passage valves of said first and second control devices comprise non-return valves.

5. The continuously blockable arresting device of claim 1, wherein said passage valves of said first and second control devices comprise non-return valves.

6. The continuously blockable arresting device of claim 1, wherein said first and second subchambers are connected to each other by a passage defined in said working space.

7. The continuously blockable arresting device of claim 1, wherein said first and second pistons are connected to said swash plate by a form-fitting connection.

8. The continuously blockable arresting device of claim 7, wherein said first and second pistons have ends facing said swash plate, said ends having a shape comprising one of a spherical or conical shape, said swash plate having a receptacle for receiving each of said ends to make the form-fitting connection.

9. The continuously blockable arresting device of claim 1, further comprising springs for prestressing said first and second pistons against said swash plate.

10. The continuously blockable arresting device of claim 9, wherein said spring comprises one of a helical spring and a disc spring.

11. The continuously blockable arresting device of claim 9, wherein said first and second control devices respectively support said springs arranged in said first and second subchambers.

12. The continuously blockable arresting device of claim 1, wherein said first and second pistons are arranged at an angular spacing of 180° on said swash plate.

13. The continuously blockable arresting device of claim 1, further comprising an actuating element connected to said shaft, said actuating element receiving a force acting on said shaft and said shaft being rotatable by said actuating element.

14. The continuously blockable arresting device of claim 1, further comprising a gear mechanism arranged between said shaft and said swash plate or between said actuating element and said swash plate.

15. The continuously blockable arresting device of claim 14, wherein said gear mechanism comprises a step-up gear mechanism.

16. The continuously blockable arresting device of claim 1, wherein said shaft is connectable to a part external to said arresting device that is to be pivoted about a pivot axis, said shaft being arrangeable coaxially with the pivot axis of the part or parallel to the pivot axis.

17. The continuously blockable arresting device of claim 1, wherein said working space contains a volume of gas arranged therein on a side of said working space facing away from said first and second pistons.

18. The continuously blockable arresting device of claim 17, further comprising a membrane arranged between the fluid and the volume of gas in said working space.

* * * * *